United States Patent [19]

Davidian

[11] Patent Number: 5,203,810
[45] Date of Patent: Apr. 20, 1993

[54] METHOD OF MAKING A PLASTIC LINED CONCRETE STRUCTURE

[75] Inventor: Michael Davidian, Oak Brook, Ill.

[73] Assignee: Wilbert, Inc., Broadview, Ill.

[21] Appl. No.: 927,930

[22] Filed: Aug. 11, 1992

Related U.S. Application Data

[62] Division of Ser. No. 668,770, Mar. 13, 1991, Pat. No. 5,157,817.

[51] Int. Cl.$^5$ .............................................. A61G 17/00
[52] U.S. Cl. ............................................ 27/35; 52/135
[58] Field of Search ................. 27/7, 8, 35, 2; 52/135, 52/139

[56] References Cited

U.S. PATENT DOCUMENTS

| | | | |
|---|---|---|---|
| 2,911,703 | 11/1959 | Sheene, Sr. | 27/35 |
| 2,940,156 | 6/1960 | Cook | 27/35 |
| 3,130,520 | 4/1964 | Newman, Jr. | 52/135 |
| 3,283,386 | 11/1966 | Cenegy | 27/7 |
| 3,439,461 | 4/1969 | Chandler et al. | |
| 3,787,545 | 1/1974 | Chandler et al. | |
| 4,261,083 | 4/1981 | Darby et al. | 27/35 |
| 4,476,657 | 10/1984 | Juba et al. | 52/139 |

*Primary Examiner*—David A. Scherbel
*Assistant Examiner*—Joanne C. Downs
*Attorney, Agent, or Firm*—Andrus, Sceales, Starke & Sawall

[57] ABSTRACT

A method of making a concrete structure, such as a burial vault, having an integrally bonded thermoplastic resin liner. The liner is a rigid molded product having a bottom wall and side walls and an open top. A thermosetting resin adhesive is applied to the outer surface of the liner and consists of an epoxy resin system, a solvent for the thermoplastic liner, and a surfactant. Before the adhesive is fully cured, wet flowable concrete is applied to the adhesive layer. The solvent acts to solubilize the outer surface of the plastic liner, while the surfactant reduces the hydrophobic characteristics of the adhesive to provide a firmly bonded composite structure.

6 Claims, No Drawings

METHOD OF MAKING A PLASTIC LINED CONCRETE STRUCTURE

This is a division of application Ser. No. 07/668,770, filed Mar. 13, 1991, now U.S. Pat. No. 5,157,817.

BACKGROUND OF THE INVENTION

Various constructions have been used for burial vaults in the past. A common form of burial vault is made of concrete having an asphalt inner liner or an inner liner of fiber reinforced resin. Other burial vaults have been made of molded plastic materials.

Reinforced concrete burial vaults have adequate structural and tensile strength to resist the crushing force of the overlying earth and the hydraulic pressure to which the vault is subjected when it is interred in a grave, as well as being able to withstand the impact of handling equipment. On the other hand, burial vaults made entirely of synthetic or plastic materials generally lack the strength to withstand the weight of the overlying earth and the hydraulic pressures to which the vault is subjected.

U.S. Pat. Nos. 3,439,461 and 3,787,545 describe a concrete burial vault having an integrally bonded inner plastic liner. In accordance with the aforementioned patents, a rigid open top liner is molded from thermoplastic resin and an uncured epoxy resin adhesive is applied to the outer surface of the liner. While the epoxy resin is in an uncured state, a wet concrete mix is applied directly onto the adhesive and on curing of the adhesive and the concrete, a composite structure is formed in which the concrete is bonded to the inner thermoplastic liner.

In use of the method, as described in the aforementioned patents, positive bonding of the concrete layer to the plastic liner is generally not possible without the use of a solvent, which is capable of solubilizing the outer surface of the plastic liner to thereby permit the adhesive to thoroughly wet and combine with the thermoplastic liner. The solvents commonly used for this purpose are aromatic solvents, since they are compatible with the adhesives and are capable of solubilizing the thermoplastic liner. However, aromatic solvents tend to be hydrophobic and therefore tend to be counterproductive during the intermixing process with the wet concrete. Although good bonds can be made between the concrete and the plastic liner, as the amount of solvent and the ambient conditions must be precisely controlled in order to obtain a proper evaporation rate of the solvent and achieve the necessary concentration of solvent in the adhesive when the concrete is poured.

If solvents with relatively fast evaporation rates are used, the rapid evaporation of the solvent leaves the adhesive relatively uncured. Further, the use of rapidly evaporating solvents increases the risk of fire or explosion as these solvents are highly flammable. Because of this, the trend in industry has been to use slower evaporating solvents. However, the slower evaporating solvents will remain in the adhesive layer for a longer period of time and increase the hydrophobic characteristics of the adhesive layer. As the concrete must be poured before the adhesive cures, the use of slower evaporating solvents will result in residual solvents being present in the adhesive which reduces the bond between the concrete and the plastic liner.

Therefore, in utilizing the method as set forth in the aforementioned patents, there must be accurate and precise control of the evaporation of the solvent in conjunction with the curing of the resin and, in practice, it is virtually impossible to maintain this control due to variations in ambient temperature, humidity, local air velocity and the like.

SUMMARY OF THE INVENTION

The invention is directed to a method of making a plastic lined concrete structure, such as a burial vault, and is an improvement to that disclosed in U.S. Pat. Nos. 3,439,461 and 3,787,545. The burial vault of the invention includes a rigid thermoplastic liner that is molded with a generally rectangular configuration, including a bottom wall, side walls and an open top. A thermosetting resin adhesive is applied to the outer surface of the liner, and while the adhesive is only partially cured, a wet concrete mix is applied directly to the adhesive.

In accordance with the invention, the adhesive includes an epoxy resin system, a solvent for the thermoplastic liner, and a surfactant.

The solvent is a type which is compatible with the epoxy resin system and which is capable of dissolving or solubilizing the outer surface of the thermoplastic liner.

The surfactant acts to emulsify the adhesive and the solvent and serves to minimize the hydrophobic properties of the adhesive to provide a thorough intermingling and bonding between the adhesive and the wet concrete.

By incorporating small amounts of the surfactant into the adhesive, the criticality between solvent evaporation and polymerization of the resin is eliminated and the wet concrete can be poured into contact with the adhesive immediately after application of the adhesive to the liner, or within several hours, with little variation in the bonding effect. The surfactant emulsification characteristics are nullified when the adhesive cures and the surfactant is encased in the adhesive matrix.

Other objects and advantages will appear in the course of the following description.

DESCRIPTION OF THE PREFERRED EMBODIMENT

The invention relates to a method of making a concrete structure having an integrally bonded plastic liner and in particular to a burial vault construction which is an improvement to that disclosed in U.S. Pat. Nos. 3,439,461 and 3,787,545. In general, the burial vault comprises an inner rigid, molded, thermoplastic liner having a generally rectangular configuration, including a bottom wall and side walls, and an outer layer of concrete which is bonded to the outer surface of the liner by a thermosetting resin adhesive. In addition, a lid for the vault can be constructed in a similar manner, including a thermoplastic liner and an outer layer of concrete which is bonded to the liner through the thermosetting resin adhesive.

The thermoplastic liner generally has a wall thickness in the range of 0.015 to 0.100 inches and can be composed of a material, such as polystyrene, acrylic, polyvinylchloride, ABS (acrylobutadienestyrene), or the like.

The concrete is a standard type and can be applied or poured around the liner in the manner set forth in the aforementioned patents. As poured around the liner, the concrete contains a substantial amount of water and has a slump, generally in the range of 2 to 11.

The adhesive is preferably an epoxy resin system that contains a substantial portion of a solvent for the thermoplastic liner and a surfactant. In general, the adhesive has the following composition in weight percent:

| Epoxy resin system | 30%–90% |
|---|---|
| Solvent | 5%–60% |
| Surfactant | 0.25%–10% |

The preferred composition for the adhesive is as follows:

| Epoxy resin system | 50%–80% |
|---|---|
| Solvent | 10%–40% |
| Surfactant | 1%–3% |

The epoxy resin system is a conventional type and includes an epoxy resin, a curing agent for the epoxy resin, such as a polyamide resin, and an accelerator which can take the form of N-aminoethylpiperizine or triethanolamine.

The solvent to be used must be compatible with the epoxy resin system and must be capable of solubilizing the outer surface of the thermoplastic liner. Suitable solvents include aromatic solvents such as toluene, xylene, and trimethylbenzene; ketones such as methyl-n-amyl ketone, diethyl ketone, methylisobutyl ketone; esters such as ethyl acetate, glycoether acetate, amyl acetate; chlorinated solvents, such as methylene chloride, 1,1,1-trichloroethane, and the like.

The surfactant serves an important function in the adhesive in that it emulsifies the adhesive and the solvent. The surfactant should be a type which will not bleed to the surface of the cured adhesive/plastic interface to cause water sensitivity. Suitable emulsifiers that can be used are polysorbates such as polyethylene sorbitan esters of mixed fatty acids (Tween 80, DuPont de Nemours); alkyl sulfates such as sodium lauryl sulfate; phosphate esters such as Triton CF-10 sold by Rohm & Haas; alcohols such as tertiary acetylenic diol or acetylphenoxypolyethoxyethanol, quaternary ammonium salts such as Arquad 2C-75 sold by ICI Americas; Emulsifier A5 and Emulsifier 378 sold by ICI Americas; fatty alcohol sulfates; alkyloamides; sulfosuccinates; betaines, imidazolines; and the like.

The surfactant enables the adhesive to come into intimate contact with the aqueous concrete. The adhesive contains a solvent to wet and solubilize the plastic liner. However, the solvent is normally hydrophobic and non-miscible with water. Since a strong bond must be formed between the plastic liner and the wet concrete it is the purpose of the surfactant to minimize the hydrophobic properties of the adhesive and to permit the adhesive to thoroughly wet the concrete.

The adhesive can also contain a finely divided, generally inert, filler to reduce the cost of the adhesive and provide bulk for the bond-line area. Typical fillers that can be used are calcium carbonate, silica flour, and the like. If a filler is used, the adhesive can have the following composition in weight percent:

| Epoxy resin system | 30%–60% |
|---|---|
| Solvent | 10%–40% |
| Surfactant | 0.5%–3% |
| Filler | 10%–40% |

The adhesive can also contain up to about 15% by weight of a thermoplastic resin which acts to reduce concrete "wash-away" and promote adhesion to the thermoplastic liner, up to 5% by weight of an antisettling agent, such as Carbosil (fumed silica), to prevent settling of the filler, and up to 10% of a colorant, such as titanium dioxide.

The wet flowable concrete can be applied to the adhesive coated thermoplastic liner in the manner disclosed in U.S. Pat. Nos. 3,439,461 and 3,787,545.

The adhesive is generally used in a two-part resin system with the epoxy resin in contained in one part and the curing agent and the accelerator in the second part. The solvent and surfactant, and fillers, if used, can be incorporated with both parts of the resin system. At the time of use, the two parts are mixed together and applied to the outer surface of the thermoplastic liner.

Typical adhesive formulations in weight percent that can be used in the invention are as follows:

| | Percentage |
|---|---|
| EXAMPLE I | |
| Adhesive Part A | |
| Epoxy resin (EW-190) | 45% |
| Piccolastic resin | 5% |
| Calcium Carbonate | 26% |
| Aromatic solvent 100 | 19% |
| Carbosil EH-5 (fumed silica) | 2% |
| Titanium dioxide | 2% |
| Tween 80 (polysorbate) | 1% |
| | 100% |
| Adhesive Part B | |
| Polyamide resin | 42% |
| Calcium Carbonate | 28% |
| Aromatic solvent 100 | 19% |
| Carbosil EG-5 | 2% |
| N-aminoethylpiperizine | 8% |
| Tween 80 | 100% |
| EXAMPLE II | |
| Adhesive Part A | |
| Epoxy resin (EW-190) | 44% |
| Silica flour | 27% |
| Wingstack resin (thermoplastic resin) | 5% |
| Xylene | 18% |
| Emulsifier 37 (surfactant) | 2% |
| Bentone (fumed silica) | 3% |
| Methanol | 1% |
| | 100% |
| Adhesive Part B | |
| Amidoamine resin | 38% |
| Triethanolamine | 6% |
| Silica Flour | 40% |
| Xylene | 15% |
| Emulsifier 37 | 1% |
| | 100% |

The wet flowable concrete is applied over the adhesive while the adhesive is in an uncured or only partially cured condition. Due to the use of the surfactant, the time at which the wet concrete is applied to the adhesive is not critical and the concrete can be applied immediately after application of the adhesive to the liner, or any time up to several hours after the application of the adhesive to the liner.

The adhesive, as well as the concrete are cured or set, preferably at room temperature to provide a composite structure, in which the concrete is firmly bonded to the plastic liner. The surfactant provides a critical function in that it permits in situ emulsification of the solvent laden adhesive, thereby minimizing the hydrophobic properties of the adhesive when contacted with the aqueous concrete. The surfactant emulsification characteristics are nullified when the adhesive system cures, with the surfactant being encased in the adhesive matrix.

Various modes of carrying out the invention are contemplated as being within the scope of the following claims particularly pointing out and distinctly claiming the subject matter which is regarded as the invention.

I claim:

1. A method of producing a plastic lined concrete structure, comprising the steps of molding a rigid thermoplastic liner, applying a thermosetting resin adhesive to a surface of said liner, said adhesive comprising an epoxy resin system, a solvent compatible with said epoxy resin system and capable of solubilizing the outer surface of said liner, and a surfactant capable of emulsifying said epoxy resin system and said solvent, applying wet flowable concrete to said adhesive layer, and curing said adhesive and said concrete to provide a composite structure in which the concrete is firmly bonded to the liner, said surfactant acting to reduce the hydrophobic characteristics of said adhesive to provide an improved bond between said concrete and said liner.

2. The method of claim 1, and including the step of molding the thermoplastic resin into a generally rectangular shape, including a bottom wall, side walls and an open top.

3. The method of claim 1, and including the step of maintaining the adhesive in an uncured state when the wet concrete is applied thereto.

4. The method of claim 1, wherein said adhesive comprises by weight from 30% to 90% of said epoxy resin system, 5% to 60% of said solvent and 0.25% to 10% of said surfactant.

5. The method of claim 1, wherein said adhesive also includes a finely divided generally inert filler.

6. The method of claim 5, wherein said adhesive comprises by weight from 10% to 40% of said epoxy resin system, 30% to 60% of said solvent, 0.5% to 3% of said surfactant, and 10% to 40% of said filler.

* * * * *